…

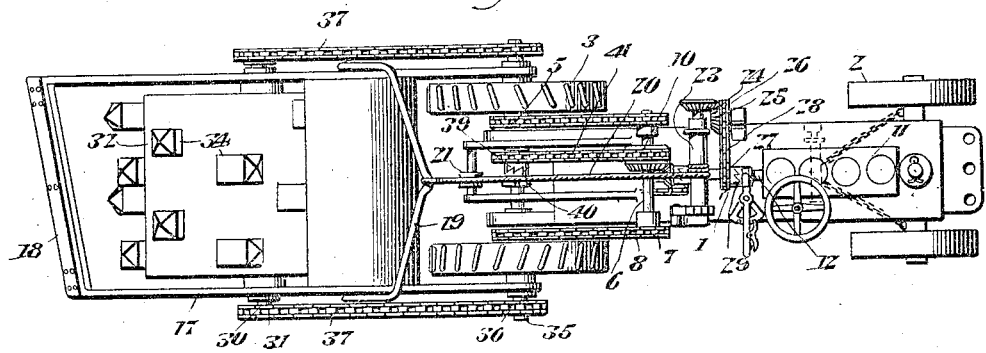
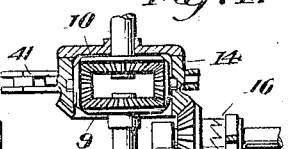
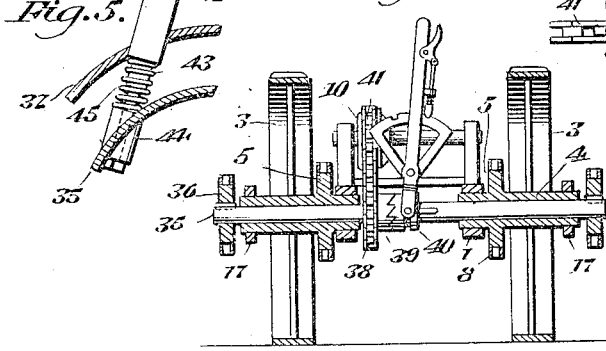
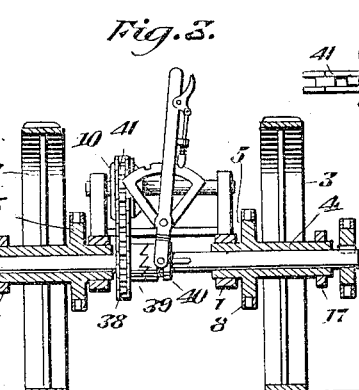
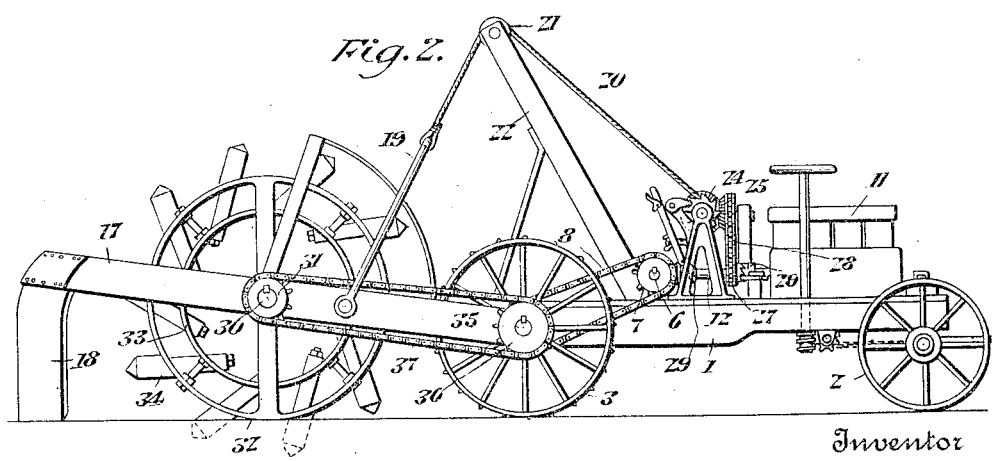

UNITED STATES PATENT OFFICE.

ROBERT DIXON, OF ARMELLS, MONTANA.

MOTOR-PLOW.

1,289,700.  Specification of Letters Patent.  Patented Dec. 31, 1918.

Application filed June 21, 1918. Serial No. 241,226.

*To all whom it may concern:*

Be it known that I, ROBERT DIXON, a citizen of the United States, residing at Armells, in the county of Fergus and State of Montana, have invented new and useful Improvements in Motor-Plows, of which the following is a specification.

This invention relates to motor plows and it consists in the novel features hereinafter described and claimed.

An object of the invention is to provide a simple, and improved construction of motor plow with means for manipulating or handling the movable parts thereof in order that the plow may be operated by one person who may supervise the propulsion or movement of the plow and the turning of the same in a field.

With these and other ends in view which will readily appear as the nature of the invention is better understood, the same consists in the improved construction and novel arrangement and combination of parts which will be hereinafter fully described and particularly claimed.

In the accompanying drawing has been illustrated a simple and preferred form of the invention, it being however, understood that no limitation is necessarily made to the precise structural details therein exhibited, but that changes, alterations and modifications within the scope of the claims may be resorted to when desired.

In the accompanying drawing:

Figure 1 is a top plan view of the motor plow;

Fig. 2 is a side elevation of the same;

Fig. 3 is a transverse sectional view of the same;

Fig. 4 is a detailed horizontal sectional view of a compensating gear used upon the plow;

Fig. 5 is a fragmentary detailed sectional view of a modified form of a digger which may be used upon the plow.

The plow comprises a frame or platform 1 which is mounted at its forward end upon dirigible or steering wheels 2. Any suitable means may be provided for steering or guiding the wheels 2. Wheels 3 have their hubs 4 journaled in the rear portion of the frame 1 and at the sides thereof. Sprocket wheels 5 are fixed to the hubs 4. Shafts 6 are journaled upon the intermediate portion of the frame 1 and the said shafts are in longitudinal alinement with each other. Sprocket wheels 7 are mounted upon the shafts 6 and sprocket chains 8 are trained around the sprocket wheels 5 and 7 and are adapted to transmit rotary movement from the shafts 6 to the hubs 4 and wheels 3. Beveled gear wheels 9 are fixed to the inner ends of the shafts 6 and constitute part of a compensating gear mechanism indicated in general at 10. This mechanism is of a usual structure and operatively connects the shafts 6 together although it may permit one shaft to rotate in one direction while the other shaft is rotating in an opposite direction.

An engine 11 is mounted upon the frame 1 and a shaft 12 loosely carries at its rear end a beveled pinion 13 which meshes with the teeth of a drum 14 which is part of the compensating gear 10. The gear wheel 13 is provided with a clutch hub 15 and a clutch member 16 is slidably mounted upon the shaft 12 and may be moved into engagement with the hub 15 whereby the wheel 13 is fixed with relation to the shaft 12, hence it will be seen that when the shaft 12 is rotated rotary movement is transmitted by the wheel 13 and compensating gear 10 to the shafts 6. Thus means are provided for propelling the machine over the surface of the ground. A yoke 17 is pivotally mounted at its ends upon the outer portions of the hubs 4 and the said yoke carries at its rear intermediate portion a scraper blade 18. A bail 19 is pivotally connected with the intermediate portions of the side of the yoke 17, and a cable 20 is connected at one end with the bail 19 and is trained over a pulley 21 which is journaled upon a derrick structure 22 mounted upon the frame 1. A winch 23 is journaled for rotation at the intermediate portion of the frame 1 and the cable 20 is arranged to wind thereon. A beveled gear wheel 24 is carried by the said shaft and meshes with a bevel gear wheel 25 which is provided with sprocket teeth 26.

A sprocket wheel 27 is loosely mounted upon the shaft 12 hereinbefore described and a sprocket chain 28 is trained around the sprocket wheel 27 and the teeth 26 of the wheel 25. A clutch member 29 is slidably mounted upon the shaft 12 and may engage the hub of the wheel 28 whereby the wheel 28 is fixed with relation to the shaft 12. Consequently when the clutch member 29 is in engagement with the hub of the wheel 28 and the shaft 12 is rotating rotary movement is transmitted by the chain 27 and connected wheels to the shaft of the winch 23. Therefore the cable 20 is wound upon or may unwind from the said winch and the rear portion of the yoke 17 is raised or lowered.

A shaft 30 is journaled in the side portions of the yoke 17 and extends transversely across the same. Sprocket wheels 31 are fixed to the ends of the shaft 30. A drum 32 is mounted upon the intermediate portion of the shaft 30 and a cylinder 33 is located within the drum 32 and spaced therefrom. Tangentially disposed diggers 34 are carried by the drum 32 and cylinder 33. As the drum 32 rotates the diggers 34 enter the soil and till or turn the same in a usual manner.

A shaft 35 is journaled for rotation in the hubs 4 of the wheels 3 and is provided at its ends with sprocket wheels 36. Chains 37 are trained around the wheels 36 and wheels 31 and are adapted to transmit rotary movement from the shaft 35 to the shaft 30 which in turn rotates the drum 32 as hereinbefore described.

The sprocket wheel 38 is loosely mounted on the shaft 35 and is provided with a clutch hub 39 adapted to be engaged by a clutch member 40 slidably mounted on the shaft 35 whereby the wheel 38 is fixed with relation to the shaft 35. A chain 41 is trained around the wheel 38 and the drum 14 of the compensating mechanism and is adapted to transmit rotary movement from the said drum to the shaft 35 when the clutch member 40 is in engagement with the hub 39. Consequently it will be seen that means are provided for rotating the drum 32 from the engine.

In the modified form of digger as illustrated in Fig. 5 of the drawing the same consists of an active end portion 42 which passes through the drum 32 and which is provided at its inner end with a shank 43. An abutment member 44 is fixed in the cylinder 33 and the shank 43 passes longitudinally through the said abutment member. A coil spring 45 is interposed between the adjacent ends of the abutment member 44 and the active portion 42 and surrounds the intermediate part of the shank 43. The active portion 42 is slidably mounted in the drum 32. Consequently as the said active portion enters the ground and encounters an obstruction as for instance a large stone or rock the spring 43 will contract whereby the active portion 42 may move or pass over the rock and slide in the drum 32. Thus the tilling mechanism may pass over rocky ground without lifting the same by forcing rigid diggers in contact with obstructions in the ground.

From the foregoing description taken in conjunction with the accompanying drawing it will be seen that a plow of simple and durable structure is provided and that the same may be economically used or manipulated by a single operator to effect the propulsion of the plow and to accomplish the turning of the same at the ends of rows or at any point within a field.

Having described the invention what is claimed is:—

1. A plow comprising a frame, dirigible wheels supporting the forward portion of the frame, wheels having hubs journaled in the rear portion of the frame, an engine mounted on the frame, means for rotating the hubs from the engine, a yoke pivotally mounted on the hubs of the wheels, a digging element carried by the yoke, a shaft journaled in the hubs, means operatively connecting the shaft with the digging element, means for rotating the shaft from the engine and means adapted to be operated by the engine for raising and lowering the yoke.

2. In a plow of the class described, a frame, supporting wheels having bearings in the frame, an axle shaft on which said wheels are mounted, a yoke pivotally connected to said shaft, a revoluble digging element carried by the yoke, means to raise and lower the yoke, power means to drive the wheels independently of the axle shaft, means to cause said power means to revolve said axle shaft independently of the wheels and connections between said shaft and said revoluble digging element to cause said digging element to be driven from said shaft.

In testimony whereof I affix my signature.

ROBERT DIXON.

Copies of this patent may be obtained for five cents each, by addressing the "Commissioner of Patents, Washington, D. C."